United States Patent
Jiang et al.

(10) Patent No.: US 9,528,041 B2
(45) Date of Patent: Dec. 27, 2016

(54) BIONIC DRILLING FLUID AND PREPARATION METHOD THEREOF

(71) Applicant: China University of Petroleum (Beijing), Beijing - Changping District (CN)

(72) Inventors: Guancheng Jiang, Beijing (CN); Yang Xuan, Beijing (CN); Xianmin Zhang, Beijing (CN); Xianzhu Wu, Beijing (CN); Wei Ouyang, Beijing (CN)

(73) Assignee: China University of Petroleum (Beijing), Beijing (CN)

( * ) Notice: Subject to any disclaimer, the term of this patent is extended or adjusted under 35 U.S.C. 154(b) by 0 days.

(21) Appl. No.: 14/871,610

(22) Filed: Sep. 30, 2015

(65) Prior Publication Data

US 2016/0333248 A1    Nov. 17, 2016

(30) Foreign Application Priority Data

May 14, 2015 (CN) .......................... 2015 1 0245651

(51) Int. Cl.
*C09K 8/12* (2006.01)
(52) U.S. Cl.
CPC ............. *C09K 8/12* (2013.01); *C09K 2208/10* (2013.01); *C09K 2208/12* (2013.01)
(58) Field of Classification Search
CPC ............... C09K 8/03; C09K 8/04; C09K 8/12; C09K 8/588; C09K 2208/10; C09K 2208/12; C07K 1/00; C07D 295/00

USPC .................................................. 507/100, 200
See application file for complete search history.

(56) References Cited

U.S. PATENT DOCUMENTS

| | | | |
|---|---|---|---|
| 4,647,384 A | 3/1987 | Bardoliwalla | |
| 5,298,565 A * | 3/1994 | Lange | C08F 255/00 508/264 |
| 5,658,464 A * | 8/1997 | Hann | C02F 5/125 210/697 |
| 7,288,532 B1 * | 10/2007 | Payne | C12P 19/26 435/101 |
| 2006/0065396 A1 | 3/2006 | Dawson | |
| 2013/0157905 A1 * | 6/2013 | Saini | C09K 8/685 507/212 |

FOREIGN PATENT DOCUMENTS

WO    2014191389    12/2014

* cited by examiner

*Primary Examiner* — Frances Tischler
(74) *Attorney, Agent, or Firm* — Calfee, Halter & Griswold LLP

(57) ABSTRACT

The present subject matter relates to the drilling fluid field, and discloses a bionic drilling fluid and a method for preparation of the bionic drilling fluid. The bionic drilling fluid comprises a specific bionic wall bracing agent, a bionic shale inhibitor, a filtrate reducer, and an amphiphilic reservoir protectant, wherein, the filtrate reducer comprises microcrystalline cellulose. The bionic drilling fluid provided in the present subject matter can effectively solve the problem of well wall instability, and has great industrial application prospects.

12 Claims, No Drawings

BIONIC DRILLING FLUID AND PREPARATION METHOD THEREOF

CROSS REFERENCE TO RELATED APPLICATIONS

This application claims priority to Chinese Patent Application No. 201510245651.1 filed on May 14, 2015 and entitled "A Bionic Drilling Fluid and Preparation Method Thereof", the entire content of which is fully incorporated here by reference.

FIELD OF THE INVENTION

The present subject matter relates to the drilling fluid field, and discloses a bionic drilling fluid and a method for preparing the bionic drilling fluid.

BACKGROUND OF THE INVENTION

As the demand for oil and gas resources becomes higher increasingly in China, more and more deep-wells, ultra-deep wells, and shale gas wells are drilled. Thus, the performance of drilling fluids must meet more demanding requirements. Wherein, the problem of well wall stability in the well drilling process has always been a challenge not solved completely yet in the world, and downhole complexities and accidents such as well caving, shrinkage, wedging of drilling tools, and bit balling, etc. resulted from well wall instability cause severe economic loss every year in the petroleum industry.

To solve the problem of well wall stability, at present, oil-based drilling fluid and high-performance water-based drilling fluid systems are mainly used in China and foreign countries. Oil-based drilling fluids have drawbacks including high cost, severe environmental pollution, and poor well-cementing effect, etc., though they can effectively stabilize well walls. As for high-performance water-based drilling fluids, the present design concept in the art is to select or design drilling fluid systems that can maintain the effective stress in mud shale as far as possible, merely in consideration of the aspect of "preventing the drilling fluid from causing hydrated swelling of the clay in the mud shale". However, owing to the fact that there is no water-based drilling fluid system that can completely inhibit the hydration of clay, the well wall instability problem can't be solved. Hence, water-based drilling fluids can't replace oil-based drilling fluids to meet the requirement of well drilling under complicated geological conditions in unconventional oil and gas reservoirs. Since mud shale well wall instability is a result of mechanical-chemical coupled action, the development must starts from the aspect of enhancing the cohesive force in the mud shale of well wall (i.e., well wall strengthening), with consideration of chemical clay inhibition and micro-pore plugging in the mud shale, in order to effectively solve the problem of well wall instability. In view that the conventional drilling fluid systems can't attain the purpose of strengthening the well wall in the drilling process, it is urgent task to seek for a drilling fluid system that can effectively stabilize the well wall with a synergistic effect of strengthening, plugging, and inhibition.

SUMMARY OF THE INVENTION

The object of the present subject matter is to overcome the drawbacks in the prior art and provide a bionic drilling fluid that can effectively stabilize well walls and a method for preparing the bionic drilling fluid.

Specifically, the present subject matter provides a bionic drilling fluid, comprising a bionic wall bracing agent, a bionic shale inhibitor, a filtrate reducer, and an amphiphilic reservoir protectant, wherein, the filtrate reducer comprises nanocrystalline cellulose; the bionic wall bracing agent comprises a backbone moiety of carboxymethyl chitosan with dopamine-derived base groups grafted on the backbone, wherein, the dopamine-derived base groups are represented by formula (1):

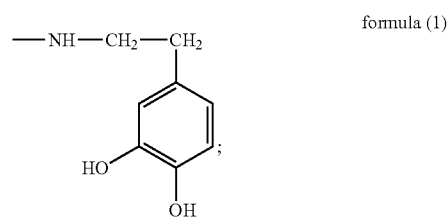

formula (1)

the bionic shale inhibitor is composed of structural units represented by formula (2) and structural units represented by formula (3):

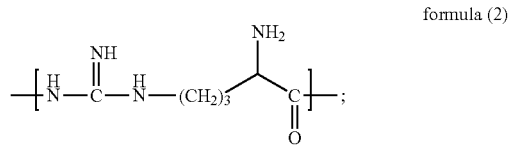

formula (2)

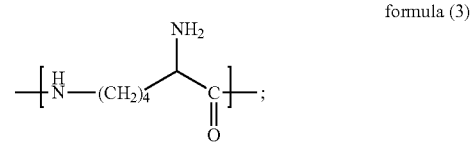

formula (3)

the molar ratio of the structural units represented by formula (2) to the structural units represented by formula (3) is 0.2-6:1, and the weight-average molecular weight of the bionic shale inhibitor is 800-4,000 g/mol;

The amphiphilic reservoir protectant is composed of structural units represented by formula (4), formula (5), formula (6), and formula (7):

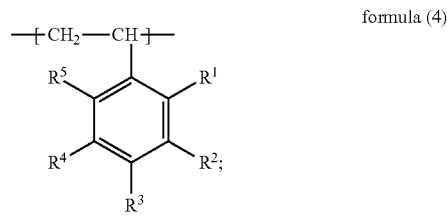

formula (4)

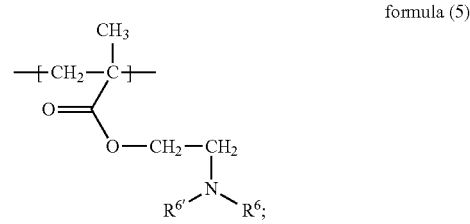

formula (5)

-continued

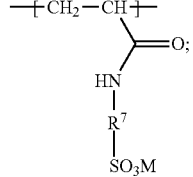

formula (6)

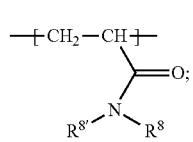

formula (7)

where, $R^1$, $R^2$, $R^3$, $R^4$, and $R^5$ are H, $C_1$-$C_4$ alkyl or $C_1$-$C_4$ alkoxyl respectively and independently; $R^6$ and $R^{6'}$ are $C_1$-$C_3$ alkyl respectively and independently; $R^7$ is substituted or unsubstituted $C_1$-$C_6$ alkyl; M is H or an alkali metal; $R^8$ and $R^{8'}$ are $C_1$-$C_6$ alkyl, hydroxyl-substituted $C_1$-$C_6$ alkyl, phenyl or $C_1$-$C_6$ alkyl-substituted phenyl respectively and independently; the molar ratio of the structural units represented by formula (4), the structural units represented by formula (5), the structural units represented by formula (6) and the structural units represented by formula (7) is 1:0.4-2:0.5-1:0.1-0.5; the weight-average molecular weight of the amphiphilic reservoir protectant is 150,000-350,000 g/mol.

Moreover, the method for preparing the bionic drilling fluid provided in the present subject matter comprises: mixing the bionic wall bracing agent, bionic shale inhibitor, filtrate reducer, amphiphilic reservoir protectant, and optional bentonite, pH regulator, flow pattern regulator, lubricant, weighting agent, and water to a homogeneous state.

When the bionic drilling fluid provided in the present subject matter contacts with the rock of well wall, the bionic wall bracing agent in the bionic drilling fluid can spontaneously solidifies into an "bionic shell" of adhesive gel with high strength on the spot, and thereby improve the strength of the rock near the well wall; the bionic shale inhibitor can be embedded into the spaces between the clay layers, and effectively inhibit hydrated swelling of the clay in the mud shale by virtue of the strong hydrogen bonding with the adjacent clay grain layers; the nanocrystalline cellulose filtrate reducer can effectively plug the nanometer-level and micrometer-level pores and micro-fractures in the mud shale; the amphiphilic reservoir protectant can attain a mud shale inhibition effect while effective protecting the reservoir. In addition, a bionic drilling fluid that contains all above-mentioned novel treating agents can attain a synergistic effect of strengthening, plugging, and inhibition, and thereby effectively solves the problem of well wall instability. The bionic drilling fluid can meet the requirements of well drilling under complicated geological conditions in unconventional oil and gas reservoirs, and thereby can effectively maintain well wall stability and greatly reduce economic losses incurred by downhole complexities and accidents, including well caving, wedging of drilling tools, and bit balling, etc., and has great industrial application prospects.

Other aspects and advantages of the present subject matter will be further detailed in the embodiments hereunder.

DETAILED DESCRIPTION

Hereunder some embodiments of the present subject matter will be detailed. It should be appreciated that the embodiments described here are only provided to describe and explain the present subject matter, but shall not be deemed as constituting any limitation to the present subject matter.

The bionic drilling fluid provided in the present subject matter comprises a bionic wall a bracing agent, a bionic shale inhibitor, a filtrate reducer, and an amphiphilic reservoir protectant, wherein, the filtrate reducer comprises nanocrystalline cellulose; the bionic wall bracing agent comprise a backbone moiety of carboxymethyl chitosan with dopamine-derived base groups grafted on the backbone, wherein, the dopamine-derived base groups are represented by formula (1):

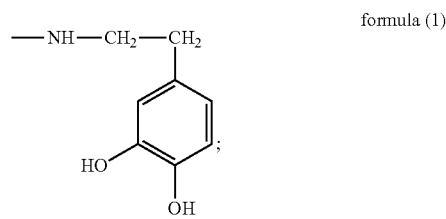

formula (1)

the bionic shale inhibitor is composed of structural units represented by formula (2) and structural units represented by formula (3):

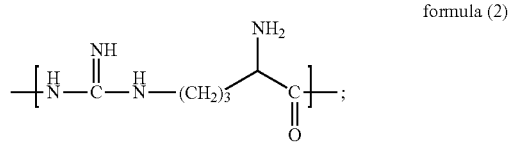

formula (2)

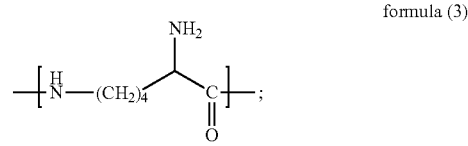

formula (3)

the molar ratio of the structural units represented by formula (2) to the structural units represented by formula (3) is 0.2-6:1, and the weight-average molecular weight of the bionic shale inhibitor is 800-4,000 g/mol;

The amphiphilic reservoir protectant is composed of structural units represented by formula (4), formula (5), formula (6) and formula (7):

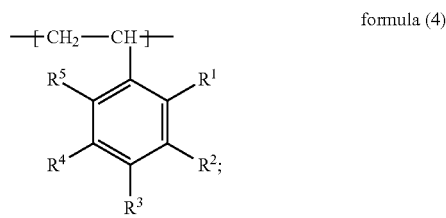

formula (4)

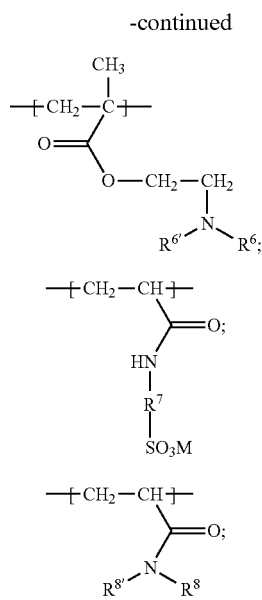

formula (5)

formula (6)

formula (7)

where, $R^1$, $R^2$, $R^3$, $R^4$, and $R^5$ are H, $C_1$-$C_4$ alkyl or $C_1$-$C_4$ alkoxyl respectively and independently; $R^6$ and $R^{6'}$ are $C_1$-$C_3$ alkyl respectively and independently; $R^7$ is substituted or unsubstituted $C_1$-$C_6$ alkyl; M is H or an alkali metal; $R^8$ and $R^{8'}$ are $C_1$-$C_6$ alkyl, hydroxyl-substituted $C_1$-$C_6$ alkyl, phenyl or $C_1$-$C_6$ alkyl-substituted phenyl respectively and independently; the molar ratio of the structural units represented by formula (4), the structural units represented by formula (5), the structural units represented by formula (6) and the structural units represented by formula (7) is 1:0.4-2:0.5-1:0.1-0.5; the weight-average molecular weight of the amphiphilic reservoir protectant is 150,000-350,000 g/mol.

There is no particular restriction on the contents of the bionic wall bracing agent, bionic shale inhibitor, nanocrystalline cellulose and amphiphilic reservoir protectant in the present subject matter. However, to enable these materials to work synergistically to provide a better well wall stability effect, in an embodiment, based on the total weight of the bionic drilling fluid, the content of the bionic wall bracing agent is 3-7 wt %, the content of the bionic shale inhibitor is 1-2 wt %, the content of the nanocrystalline cellulose is 0.5-1 wt %, and the content of the amphiphilic reservoir protectant is 2-3 wt %.

In the bionic drilling fluid provided in the present subject matter, the functional mechanism of the bionic wall bracing agent is as follows: The byssus threads of a mussel can adhere to the rock surface firmly in the marine environment, and dopamine—a special amino acid derivative contained in byssus protein—is proven to be the key factor for strong subaqueous adhesion of byssus threads. When a mussel secretes byssus protein from its body onto a seabed rock surface, the dopamine base groups in the byssus protein will have a cross-linking cure reaction with $Fe^{3+}$ ions in seawater, and thereby cohesive byssus threads with strong adhesion are formed, so that the mussel adheres to the rock surface. A bionic well wall bracing agent developed by simulating the structure of adhesive proteins produced by a mussel can contact with and is absorbed to the surface of clay shale along with the drilling fluid in the borehole drilling process, and is cross-linked and cured under the complexing action between the dopamine base groups and the $Fe^{3+}$ ions on the surface of clay shale to form a layer of polymer film in 100 μm-1 mm thickness (the thickness increases as the polymer concentration in the drilling fluid increases), which has strong adhesion. The polymer film not only can effectively prevent the drilling fluid from infiltrating into the formation, but also has enough strength to partially balance off the hydration stress borne on the rock, and thereby attains an effect of plugging the pores in the clay shale of borehole wall and improving the strength of the clay shale.

According to another embodiment of the present subject matter, the bionic wall bracing agent contains structural units represented by formula (I):

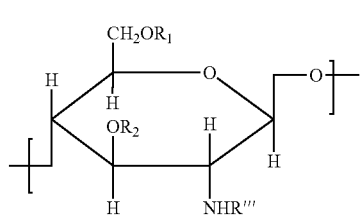

formula (I)

in formula (I), $R_1$ is H,

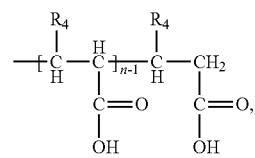

—$CH_2COOR_3'$,

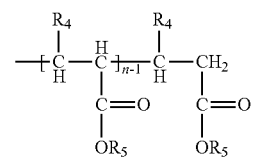

or —$CH_2COOR_3$, $R_2$ is H,

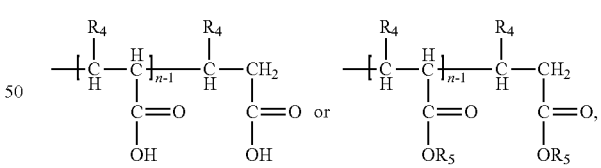

and at least one of $R_1$ and $R_2$ is

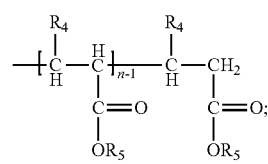

n is an integer equal to or greater than 1; n $R_5$s are H or the dopamine-derived base group respectively and independently, and at least one of the n $R_5$s is the dopamine-derived base group; $R_4$ is H or $C_1$-$C_{10}$ alkyl, R''' is H, —$CH_2COOR_3'$ or —$CH_2COOR_3$, and $R_1$ and R''' are not H at the same time; $R_3'$ is H or an alkali metal; and $R_3$ is the dopamine-derived base group.

The weight-average molecular weight of the bionic wall bracing agent can be 20,000 g/mol-150,000 g/mol, preferably is 50,000 g/mol-100,000 g/mol.

According to another embodiment of the present subject matter, in formula (I), $R_4$ is $C_2$-$C_{10}$ alkyl, more preferably is $C_2$-$C_6$ alkyl. Examples of $R_4$ include, but not limit to ethyl, propyl, iso-propyl, and butyl.

According to an embodiment of the present subject matter, the bionic wall bracing agent is prepared with a method comprising the following steps:
(1) initiating a graft copolymerization reaction between a polymer that contains the structural units represented by formula (III) and an unsaturated carboxylic acid represented by general formula $R_4CH\!=\!CHCOOH$;
(2) reacting the polymer obtained in step (1) with at least one of dopamine and dopamine hydrochloride;

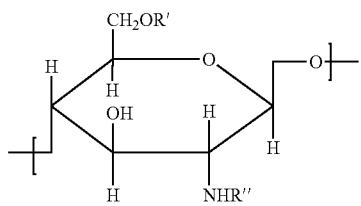

formula (III)

where, R' and R'' are H or —$CH_2COOR_3'$ respectively and independently, and R' and R'' are not H at the same time; $R_3'$ is H or an alkali metal; and $R_4$ is H or $C_1$-$C_{10}$ alkyl.

In the preparation process of the bionic well wall bracing agent, in step (1), the conditions of the graft copolymerization reaction can include: temperature: 50-90° C., preferably 60-80° C.; reaction time: 1-10 h, preferably 2-6 h; the molar ratio of the polymer that contains the structural units represented by formula (III) calculated in hydroxyl groups to the unsaturated carboxylic acid can be 1:0.1-4, preferably 1:0.5-3; the graft copolymerization reaction can proceed with an initiator in presence, and the initiator can be one or more of ammonium ceric nitrate, potassium persulfate, and ammonium persulfate.

In another embodiment, the polymer that contains the structural units represented by formula (III) is carboxymethyl chitosan. In another embodiment, the carboxymethyl chitosan is mixed, contacts with, and have a graft copolymerization reaction with the unsaturated carboxylic acid in the form of water solution. The water solution of carboxymethyl chitosan can be obtained by dissolving carboxymethyl chitosan (with 10,000 g/mol-80,000 g/mol weight-average molecular weight) in water while stirring (the stirring rate can be 100-500 rpm). The volume of water can be determined appropriately, as long as the carboxymethyl chitosan can be dissolved completely; in another embodiment, the weight ratio of carboxymethyl chitosan to water is 1:20-50.

The unsaturated carboxylic acid can be an unsaturated monocarboxylic acid with carbon number equal to or greater than 3; the carbon number in the unsaturated carboxylic acid is preferably 3-11, more preferably is 3-7. The examples of the unsaturated carboxylic acid include, but not limit to acrylic acid and/or methacrylic acid.

In the Preparation process of the bionic wall bracing agent, in step (2), the conditions of the condensation reaction can include: reaction temperature: 10-50° C., preferably 20-40° C.; reaction time: 2-48 h, preferably 6-36 h. The molar ratio of the concentration of the polymer obtained in step (1) (calculated in carboxyl groups) to the total concentration of the both dopamine and dopamine hydrochloride (calculated in amide groups) can be 1:0.01-0.2, preferably is 1:0.02-0.1. The condensation reaction can proceed with a catalyst in presence, wherein, the catalyst can be 1-ethyl-3-(3-dimethylaminopropyl) carbonyl diimine hydrochloride or N,N'-diisopropyl carbodiimide.

In the bionic drilling fluid provided in the present subject matter, the functional mechanism of the bionic shale inhibitor is as follows: the bionic shale inhibitor has nanometer-level pores that have high positive charge density and are easy to enter into mud shale and absorb to the surface of clay minerals, and thereby can greatly compress the surface electric double layer of clay, decrease the swelling pressure of clay, and prevent well wall instability resulted from clay swelling. Furthermore, the bionic shale inhibitor produced from amino acids in organisms can be biodegraded in a short period after it is disposed with the waste drilling fluid by landfill disposal subsequently. Hence the bionic shale inhibitor has favorable environmental friendliness.

In the present subject matter, the weight-average molecular weight of the bionic shale inhibitor is 800-4,000 g/mol, preferably is 1,550-4,000 g/mol, more preferably is 1,600-3,300 g/mol. By confining the weight-average molecular weight of the bionic shale inhibitor disclosed in the present subject matter within the above-mentioned range, the bionic shale inhibitor can effectively diffuse into pores in mean pore size within 4-10 nm range in shale strata at 2,000 m or greater burial depth, and the bionic shale inhibitor has high adsorptive capacity and adsorptive strength on the surface of clay shale. In contrast, if the weight-average molecular weight of the bionic shale inhibitor is higher than 4,000 g/mol, it will be difficult for the bionic shale inhibitor to diffuse into the pores in mean pore size within 4-10 nm range in shale strata at 2,000 m or greater burial depth. If the weight-average molecular weight of the bionic shale inhibitor is lower than 800 g/mol, the bionic shale inhibitor will not have enough adsorptive strength on the surface of clay shale.

According to the present subject matter, the structural units represented by formula (2)

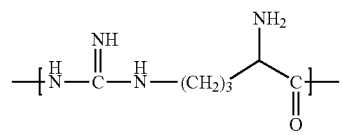

have a main chemical structure of arginine, and the structural units represented by formula (3)

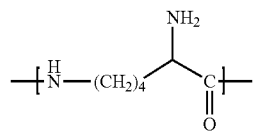

have a main chemical structure of lysine. Hence, actually, the bionic shale inhibitor disclosed in the present subject matter is a type of binary polyamino acid (i.e., condensed peptide of arginine and lysine). In the present subject matter, the structural units represented by formula (2) and the structural units represented by formula (3) are selected to constitute the bionic shale inhibitor disclosed in the present subject matter, because: on one hand, the structural units represented by formula (2) and the structural units represented by formula (3) are in amino acid structure and easy to be degraded by microbes; therefore, they can be defined as a "bionic shale inhibitor"; on the other hand, the structural unit represented by formula (2) has three loci (e.g.,

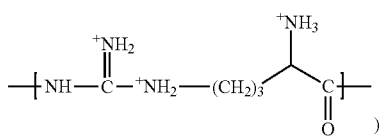

where cationic nitrogen can be formed, and the structural unit represented by formula (3) has one locus (e.g.,

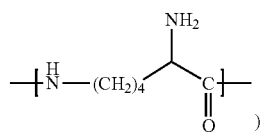

where cationic nitrogen can be formed; hence, by combining the structural units represented by formula (2) with the structural units represented by formula (3), a bionic shale inhibitor that has an appropriate quantity of cations and superior shale inhibition capability can be formed. There is no particular restriction on the terminal groups of the bionic shale inhibitor composed of the structural units represented by formula (2) and the structural units represented by formula (3) in the present subject matter. In other words, the terminal groups can be ordinary groups, such as H, hydroxyl, or salts, etc.

According to the present subject matter, though it is only required that the bionic shale inhibitor should have weight-average molecular weight within 800-4,000 g/mol range and should be composed of the structural units represented by formula (2) and the structural units represented by formula (3), the molar ratio of the structural units represented by formula (2) to the structural units represented by formula (3) preferably is 0.3-5:1, more preferably is 1-5:1, even more preferably is 1-4:1, optimally is 2-4:1, in order to ensure that the bionic shale inhibitor has better shale inhibition capability and can be more easily degraded by microbes subsequently. In a bionic shale inhibitor composed of the structural units represented by formula (2) and the structural units represented by formula (3) at the preferred molar ratio, the structural units represented by formula (2) and the structural units represented by formula (3) can work more synergistically to improve the shale inhibition capability and biodegradability of the bionic shale inhibitor, and the cost of the bionic shale inhibitor is lower.

There is no particular restriction on the structure of the binary polyamino acid. In other words, the binary polyamino acid can be a regular block copolymer, partially regular block copolymer, or random copolymer. To avoid introducing complexities into the production process, the bionic shale inhibitor disclosed in the present subject matter preferably is a random copolymer.

According to an embodiment of the present subject matter, the bionic shale inhibitor can be prepared with the following method: initiating a condensation reaction between arginine and lysine in the presence of an inorganic acid catalyst, wherein, the molar ratio of the concentration of the arginine to the concentration of the lysine is 0.2-6:1, and the conditions of the condensation reaction ensure that the weight-average molecular weight of the resultant bionic shale inhibitor is 800-4,000 g/mol.

The arginine can be of L-type, D-type, or a mixture of the two types; the lysine can be of L-type, D-type, or a mixture of the two types. In another embodiment, L-arginine and L-lysine are used.

There is no particular restriction on the concentration of the arginine and the lysine in the present subject matter, as long as the product of the condensation reaction has 800-4,000 g/mol weight-average molecular weight. In another embodiment, the molar ratio of the arginine to the lysine is 0.3-0.5:1, more preferably is 1-5:1, even more preferably is 1-4:1, optimally is 2-4:1.

In the preparation process of the bionic shale inhibitor provided in the present subject matter, the condensation reaction proceeds with an inorganic acid catalyst in presence. In the present subject matter, utilizing an inorganic acid catalyst rather than a alkaline compound has two purposes: one purpose is to promote the condensation reaction between the arginine and the lysine, so as to obtain the bionic shale inhibitor disclosed in the present subject matter at a higher yield ratio, while avoiding excessively high molecular weight of the polymer obtained through the condensation reaction; the other purpose is to enable the resultant polymer to bear cationic nitrogen at a higher level, so as to provide cations to the bionic shale inhibitor. For example, the inorganic acid catalyst can be at least one of sulfuric acid, nitric acid, phosphoric acid and hydrochloric acid at 1-6 mol/L concentration, preferably is phosphoric acid (e.g., 85-98 wt % concentrated phosphoric acid). When phosphoric acid is used as the inorganic acid catalyst, the bionic shale inhibitor disclosed in the present subject matter can be obtained at a higher yield ratio.

According to another embodiment of the present subject matter, the molar ratio of the concentration of the inorganic acid catalyst to the total concentration of arginine and lysine is 1:0.3-3, more preferably is 1:0.4-3.

In another embodiment of the present subject matter, the inorganic acid catalyst is phosphoric acid, and the molar ratio of the concentration of the phosphoric acid to the total concentration of the arginine and lysine is 1:2-3. Thus, a bionic shale inhibitor with more appropriate weight-average molecular weight can be obtained.

There is no particular restriction on the conditions of the condensation reaction in the present subject matter, as long as the bionic shale inhibitor with 800-4,000 g/mol weight-average molecular weight can be prepared from the arginine and the lysine at the specified molar ratio. In other words, ordinary conditions for synthesis of an amino acid polymer in the art can be used, for example, a condensation reaction between arginine and lysine in melted state. In another embodiment, the conditions of the condensation reaction include: 180-230° C. reaction temperature and 4-20 h reaction time. In another embodiment, the conditions of the condensation reaction include: 195-215° C. reaction temperature and 8-16 h reaction time.

The method for preparation of the bionic shale inhibitor provided in the present subject matter can further comprise: adjusting the pH of the mixture obtained through the condensation reaction to 6-7 after the condensation reaction is completed. In such a case, the pH can be adjusted with any alkaline compound, such as at least one of alkali metal hydroxides (e.g., sodium hydroxide, potassium hydroxide, and lithium hydroxide), alkali oxides (e.g., sodium oxide, potassium oxide, lithium oxide), alkali carbonates (e.g., sodium carbonate, potassium carbonate, and lithium carbonate), and alkali bicarbonates (e.g., sodium bicarbonate and potassium bicarbonate), etc. The alkaline compound can be used in the form of solution or in the form of solid (e.g., powder, grain form etc., such as sodium hydroxide powder). In another embodiment, the alkaline compound is used in the form solution; in another embodiment, the concentration of the alkaline compound solution is 1-10 mol/L. In another embodiment, the alkaline compound solution is 3-5 mol/L sodium hydroxide solution, 3-5 mol/L potassium hydroxide solution, or saturated sodium carbonate solution. According to the present subject matter, to obtain the polymer through the condensation reaction, the method may further comprise: concentrating, drying, and grinding the solution after pH adjustment.

In another embodiment, the method for preparation of the bionic shale inhibitor provided in the present subject matter further comprises: adding water for dissolution when the temperature drops to 125° C. or a lower value after the reaction is completed; separating the obtained water solution and drying the obtained solid, and then dissolving the obtained solid in dimethyl sulfoxide; finally, evaporating the obtained liquid to obtain the bionic shale inhibitor disclosed in the present subject matter.

The amphiphilic reservoir protectant provided in the present subject matter contains hydrophilic sulfonate groups as well as a large quantity of hydrophobic groups including benzene rings, N,N-dialkyl substituted amides, esters and the like. When the amphiphilic reservoir protectant is used in a bionic drilling fluid, the strongly hydrophilic sulfonate groups in the amphiphilic reservoir protectant will attach to the surface of the clay in the bionic drilling liquid, so that the hydrated film on the surface of the clay is thickened, and thereby the diffused electric doublet layer on the surface of the clay is enhanced, and flocculation or agglomeration of the clay incurred by high temperature and high-salinity electrolytes can be effectively prevented. Hence, the amphiphilic reservoir protectant can endow the bionic drilling fluid with outstanding temperature tolerance, salinity tolerance, and filtrate loss reduction properties, and can effectively prevent the bionic drilling fluid from permeating into the reservoir in high-temperature and high-salinity environments. In addition, the hydrophilic sulfonate groups in the amphiphilic reservoir protectant can attach to the surface of reservoir rock and overlying clay shale, while the hydrophobic groups extend outward from the rock surface; thus, a hydrophobic film can be formed on the rock surface. The hydrophobicity can inhibit the permeation of free water in the drilling fluid into the reservoir rock and clay shale. Thus, on one hand, the reservoir is protected against water-sensitivity damage from the drilling fluid; on the other hand, the hydrated expansion and dispersion of the clay shale can be inhibited.

According to another embodiment of the present subject matter, to obtain an amphiphilic reservoir protectant serving as a protectant for bionic drilling fluids with higher performance, among the structural units represented by formula (4), formula (5), formula (6), and formula (7), which constitute the amphiphilic reservoir protectant, $R^1$, $R^2$, $R^3$, $R^4$, and $R^5$ are H, $C_1$-$C_3$ alkyl or $C_1$-$C_3$ alkoxyl respectively and independently. In another embodiment, $R^1$, $R^2$, $R^3$, $R^4$, and $R^5$ are H, methyl, ethyl, methoxyl or ethyoxyl respectively and independently. Optimally, $R^1$, $R^2$, $R^3$, $R^4$, and $R^5$ are H, methyl, ethyl or methoxyl respectively and independently.

According to another embodiment of the present subject matter, $R^6$ and $R^{6'}$ are methyl, ethyl or n-propyl respectively and independently, more preferably are methyl or ethyl.

According to another embodiment of the present subject matter, $R^7$ is substituted or unsubstituted $C_2$-$C_6$ alkyl, more preferably is —$CH_2$—$C(CH_3)_2$—$CH_2$—, —$C(CH_3)_2$—$CH_2$—, —$CH_2$—$C(CH_3)_2$—, —$CH_2$—$C(CH_3)_2$—$CH_2$—$CH_2$—, —$CH_2$—$CH_2$—, —$CHCH_3$—$CH_2$— or —$CH_2$—$CHCH_3$—$CH_2$—, particularly preferably is —$C(CH_3)_2$—$CH_2$—, —$CH_2$—$C(CH_3)_2$—, —$CH_2$—$CH_2$—, —$CHCH_3$—$CH_2$— or —$CH_2$—$CHCH_3$—$CH_2$—, optimally is —$C(CH_3)_2$—$CH_2$—.

According to another embodiment of the present subject matter, M is H, Na, K or Li, more preferably is H or Na.

According to another embodiment of the present subject matter, $R^8$ and $R^{8'}$ are methyl, ethyl, n-propyl, n-butyl, isobutyl, n-hexyl, phenyl, p-methylphenyl, p-ethylphenyl, methylol or ethoxyl respectively and independently.

According to another embodiment of the present subject matter, in the structural units represented by formula (4), formula (5), formula (6), and formula (7), which constitute the amphiphilic reservoir protectant, $R^1$, $R^2$, $R^3$, $R^4$ and $R^5$ are H, $R^6$ and $R^{6'}$ are methyl, $R^7$ is —$C(CH_3)_2$—$CH_2$—, and $R^8$ and $R^{8'}$ are ethyl.

According to another embodiment of the present subject matter, in the structural units represented by formula (4), formula (5), formula (6), and formula (7), which constitute the amphiphilic reservoir protectant, $R^1$, $R^2$, $R^4$ and $R^5$ are H, $R^3$ is methoxyl, $R^6$ and $R^{6'}$ are ethyl, $R^7$ is —$C(CH_3)_2$—$CH_2$—, and $R^8$ and $R^{8'}$ are methyl.

According to another embodiment of the present subject matter, in the structural units represented by formula (4), formula (5), formula (6), and formula (7), which constitute the amphiphilic reservoir protectant, $R^1$, $R^2$, $R^3$, $R^4$ and $R^5$ are H, $R^6$ and $R^{6'}$ are ethyl, $R^7$ is —$C(CH_3)_2$—$CH_2$—, and $R^8$ and $R^{8'}$ are hexyl.

There is no particular restriction on the terminal groups of the polymer constituted by the structural units represented by formula (4), formula (5), formula (6) and formula (7) in the amphiphilic reservoir protectant in the present subject matter. In other words, the terminal groups can be ordinary groups, such as H, hydroxyl, or salts, etc.

Though the amphiphilic reservoir protectant can be added as a protectant into a drilling fluid as long as the weight-average molecular weight of the amphiphilic reservoir protectant is within the range of 150,000-350,000 g/mol, the film forming effect will be poor if the molecular weight is too low, and the viscosity of the drilling fluid will be too high if the molecular weight is too high. In another embodiment, the weight-average molecular weight of the amphiphilic reservoir protectant is 190,000-280,000 g/mol.

According to another embodiment of the present subject matter, the molecular weight distribution index (Mw/Mn) of the amphiphilic reservoir protectant is 1-3.5, more preferably is 2-3.

According to the present subject matter, to balance the effect of the hydrophobic end and the effect of the hydrophilic end in the amphiphilic reservoir protectant to obtain an amphiphilic reservoir protectant with superior reservoir protection performance, the contents of the four types of structural units that constitute the amphiphilic reservoir protectant should be controlled at an appropriate ratio, i.e., the molar ratio of the structural units represented by formula (4), the structural units represented by formula (5), the structural units represented by formula (6), and the structural units represented by formula (7) is 1:0.5-2:0.5-1:0.1-0.5. To further improve the performance of the amphiphilic reservoir protectant, in another embodiment, the molar ratio of the structural units represented by formula (4), the structural units represented by formula (5), the structural units represented by formula (6), and the structural units represented by formula (7) is 1:0.5-1.5:0.5-1:0.1-0.4, more preferably is 1:1-1.5:0.6-0.8:0.2-0.4.

According to an embodiment of the present subject matter, the amphiphilic reservoir protectant is prepared according to with the following method: combining with an initiator in presence, controlling with a chemical compound with the structure represented by formula (8), a chemical compound with the structure represented by formula (9), a chemical compound with the structure represented by formula (10), and a chemical compound with the structure represented by formula (11) to contact in water to obtain an emulsified mixture, and initiating a polymerization reaction; wherein, the molar ratio of the chemical compound with the structure represented by formula (8), the chemical compound with the structure represented by formula (9), the chemical compound with the structure represented by formula (10) and the chemical compound with the structure represented by formula (11) is 1:0.4-2.5:0.5-1.5:0.1-0.8; the conditions of the polymerization reaction ensure that the weight-average molecular weight of the resultant amphiphilic reservoir protectant is 150,000-350,000 g/mol;

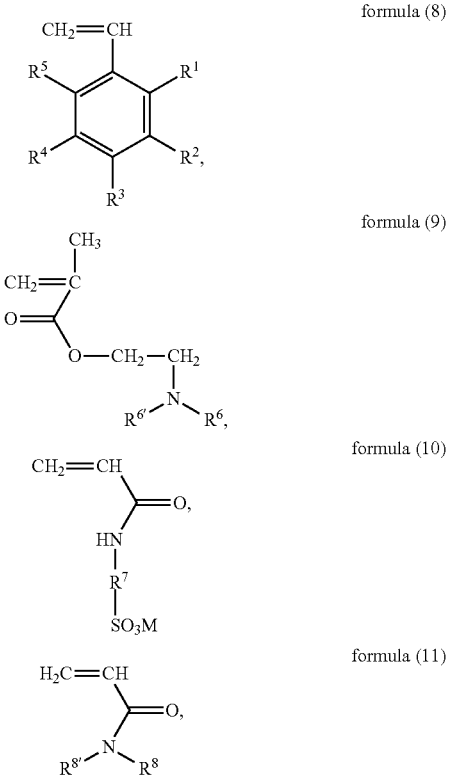

where, $R^1$, $R^2$, $R^3$, $R^4$, and $R^5$ are H, $C_1$-$C_4$ alkyl or $C_1$-$C_4$ alkoxyl respectively and independently; $R^6$ and $R^{6'}$ are $C_1$-$C_3$ alkyl respectively and independently; $R^7$ is substituted or unsubstituted $C_1$-$C_6$ alkyl; M is H or an alkali metal; $R^8$ and $R^{8'}$ are $C_1$-$C_6$ alkyl, hydroxyl-substituted $C_1$-$C_6$ alkyl, phenyl or $C_1$-$C_6$ alkyl substituted phenyl respectively and independently.

Wherein, the composition of the structural units in the amphiphilic reservoir protectant depend on the chemical compound with the structure represented by formula (8), the chemical compound with the structure represented by formula (9), the chemical compound with the structure represented by formula (10), and the chemical compound with the structure represented by formula (11), which can be selected according to the desired structure of the amphiphilic reservoir protectant. Thus, the $R^1$, $R^2$, $R^3$, $R^4$, $R^5$, $R^6$, $R^{6'}$, $R^7$, M, $R^8$ and $R^{8'}$ in the chemical compound with the structure represented by formula (8), the chemical compound with the structure represented by formula (9), the chemical compound with the structure represented by formula (10), and the chemical compound with the structure represented by formula (11) are preferably within the scopes described above.

In another embodiment, the chemical compound with the structure represented by formula (8) is at least one of styrene, 4-methyl styrene, and 4-methoxystyrene.

In another embodiment, the chemical compound with the structure represented by formula (9) is at least one of N,N-dimethylamino ethyl methacrylate, N,N-diethylamino ethyl methacrylate, N,N-dipropylamino ethyl methacrylate, N,N-dibutylamino ethyl methacrylate, and N,N-diamylamino ethyl methacrylate, more preferably is N,N-dimethylamino ethyl methacrylate and/or N,N-diethylamino ethyl methacrylate.

In another embodiment, the chemical compound with the structure represented by formula (10) is at least one of 2-acrylamide-2-methyl propanesulfonic acid, 2-acrylamide propanesulfonic acid, and 2-acrylamide-1-methyl propanesulfonic acid, more preferably is 2-acrylamide-2-methyl propanesulfonic acid.

In another embodiment, the chemical compound with the structure represented by formula (11) is at least one of N,N-dimethylacrylamide, N,N-diethylacrylamide, N,N-dipropylacrylamide, and N,N-dihexylacrylamide.

In another embodiment, the molar ratio of the chemical compound with the structure represented by formula (8), the chemical compound with the structure represented by formula (9), the chemical compound with the structure represented by formula (10), and the chemical compound with the structure represented by formula (11) is 1:0.5-2:0.5-1:0.1-0.5.

The polymerization reaction among the chemical compound with the structure represented by formula (8), the chemical compound with the structure represented by formula (9), the chemical compound with the structure represented by formula (10), and the chemical compound with the structure represented by formula (11) is actually a soap-free emulsion polymerization reaction, in which both the chemical compound with the structure represented by formula (10) and the chemical compound with the structure represented by formula (11), which are monomers, take an emulsifying effect. Hence, no other emulsifier is required in the polymerization reaction in the present subject matter. Therefore, the method for preparation of the amphiphilic reservoir protectant disclosed in the present subject matter can be used to prepare an amphiphilic reservoir protectant with higher purity at a lower cost in a simpler way.

In the preparation process of the amphiphilic reservoir protectant, the concentration of the initiator can vary in a wide range, as long as the amphiphilic reservoir protectant disclosed in the present subject matter can be obtained. In another embodiment, based on the total weight of the emulsified mixture, the concentration of the initiator is 0.5-2 wt %. The initiator can be at least one of azobis (isobutylamidine hydrochloride), 4,4'-azobis(4-cyanovaleric acid), azodiisobutyronitrile, potassium persulfate, ammonium persulfate, and hydrogen peroxide, further more preferably is at least one of azobis (isobutylamidine hydrochloride), 4,4'-azobis(4-cyanovaleric acid) and azodiisobutyronitrile. In addition, in view of the high activity of the initiator, in the preparation process of the amphiphilic reservoir protectant provided in the present subject matter, an inactive gas can be fed into the reaction system to expel oxygen in the reaction system and thereby keep the polymerization reaction in inert atmosphere before the polymerization reaction, wherein, the inactive gas is a gas that will not participate in the polymerization reaction and can expel oxygen, such as nitrogen, helium, or neon, etc. The inactive gas can be fed for 30-60 min., for example. Likewise, to control the reaction rate of the polymerization reaction, preferably the emulsified mixture is heated up to 60-75° C. before the inactive gas is fed; then, the initiator can be added, and the polymerization reaction can be started.

According to the method for preparation of the amphiphilic reservoir protectant provided in the present subject matter, the conditions of the polymerization reaction include: 65-80° C. reaction temperature and 5-10 h reaction time. If the polymerization reaction proceeds under such conditions, an amphiphilic reservoir protectant with 150,000-350,000 g/mol weight-average molecular weight can be obtained, and the amphiphilic reservoir protectant is especially suitable for use as a drilling fluid protectant.

According to the present subject matter, the amphiphilic reservoir protectant disclosed in the present subject matter can be obtained after the polymerization reaction. To produce the amphiphilic reservoir protectant into a solid product, the reaction system can be cooled down to room temperature (20-40° C.) after the polymerization reaction is completed, and then the aqueous dispersion can be evaporated with a rotary evaporator, and the obtained solid can be ground to powder state, so as to obtain an amphiphilic reservoir protectant product in yellowish powder form.

In the present subject matter, to obtain better filtrate loss reduction performance, the average grain diameter of the nanocrystalline cellulose preferably is 100-600 nm, more preferably is 150-320 nm.

In another embodiment, the nanocrystalline cellulose is in a rod form.

In the present subject matter, the micromorphology and average grain diameter of the nanocrystalline cellulose are measured with a Transmission Electron Microscope (TEM) Model JEM-2100 from JEOL (a Japanese company). Wherein, the sample preparation method is: dropping the aqueous dispersion of nanocrystalline cellulose diluted to 0.1 wt % concentration in droplets onto a copper micro grid coated with a carbon film, and dry the aqueous dispersion on the micro grid with an IR lamp.

The nanocrystalline cellulose can be commercially available or prepared with a method well known to those skilled in the art. For example, the nanocrystalline cellulose can be prepared with the following method:
(1) mixing microcrystalline cellulose with acid solution;
(2) controlling the mixture obtained in step (1) to contact with water, and then carrying out solid-liquid separation for the obtained product.

According to the method for preparation of nanocrystalline cellulose provided in the present subject matter, the purpose of mixing microcrystalline cellulose with acid solution in step (1) is to enable the acid solution to permeate into the amorphous regions in the microcrystalline cellulose so as to accelerate the hydrolysis of the microcrystalline cellulose.

Wherein, the conditions of the mixing include: mixing temperature: 30-70° C., preferably 35-60° C.; mixing time: 1-15 h, preferably 3-10 h. In another embodiment, the mixing is accomplished with a high speed mixer, the rotation speed of which can be 100-300 rpm.

According to the method for preparation of the nanocrystalline cellulose provided in the present subject matter, in step (1), the weight ratio of the microcrystalline cellulose to the acid solution can vary in a wide range, as long as the microcrystalline cellulose is hydrolyzed. Generally, the weight ratio of the microcrystalline cellulose to the acid solution can be 1:20-40, preferably is 1:20-30. In addition, the concentration of the acid solution can be 30-80 wt %, preferably is 50-70 wt %.

According to the method for preparation of the nanocrystalline cellulose provided in the present subject matter, the acid in the acid solution can be any ordinary inorganic acid or organic acid that can permeate into the amorphous regions of the microcrystalline cellulose. In the present subject matter, the inorganic acid can be any ordinary inorganic acid; for example, it can be at least one of hydrochloric acid, sulfuric acid, phosphoric acid, and nitric acid; the organic acid can be any ordinary organic acid; for example, it can be $C_1$-$C_5$ monobasic or dibasic organic carboxylic acids; specifically, it can be at least one of formic acid, acetic acid, tartaric acid, and citric acid.

The microcrystalline cellulose can be obtained commercially. To obtain nanocrystalline cellulose grains in specific size, in another embodiment, the average grain diameter of the microcrystalline cellulose grains is 20-80 μm, more preferably is 20-50 μm.

According to the method for preparation of the nanocrystalline cellulose provided in the present subject matter, in step (2), the purpose of controlling the mixture obtained in step (1) to contact with water is to terminate the hydrolytic reaction of the microcrystalline cellulose with water. In relation to 100 pbw (parts by weight) microcrystalline cellulose, the concentration of water can be 2,000-7,500 pbw, preferably is 4,000-7,500 pbw.

According to the method for preparation of the nanocrystalline cellulose provided in the present subject matter, the method of solid-liquid separation in step (2) can be any conventional solid-liquid separation method in the art. For example, it can be filtering separation and/or centrifugal separation. In another embodiment, the solid-liquid separation is centrifugal separation. There is no particular restriction on the conditions of the centrifugation in the present subject matter, as long as the resultant suspension can be separated to obtain crystals and a liquid phase. For example, the conditions of the centrifugal separation can include: centrifugation speed: 3,000-1,1000 rpm, preferably 6,000-11,000 rpm; centrifugation time: 5-30 min., preferably 10-20 min.

In the preparation process of the nanocrystalline cellulose, to eliminate the impact of residual acid on the filtrate loss reduction effect, in another embodiment, the method further comprises: washing the solid obtained through centrifugal separation with water, till the pH of the liquid obtained through centrifugation is 6-7; then, drying the solid. The conditions of the drying include: 100-110° C. drying temperature and 8-12 h drying time.

According to the present subject matter, the bionic drilling fluid may optionally contain at least one of bentonite, pH regulator, flow pattern regulator, lubricant, weighting agent, and water as required.

There is no particular restriction on the concentrations of the bentonite, pH regulator, flow pattern regulator, lubricant, weighting agent, and water in the present subject matter. For example, based on the total weight of the bionic drilling fluid, the content of the bentonite can be 2-5 wt %, the content of the pH regulator can be 0.06-0.3 wt %, the content of the flow pattern regulator can be 0.3-1 wt %, the content of the lubricant can be 2-4 wt %, the content of the weighting agent can be 10-20%, and the remaining content is water.

The bentonite can improve the suspension stability of the bionic drilling fluid. The bentonite is a non-metallic mineral material with montmorillonite as the main mineral constituent. For example, the bentonite can be sodium bentonite and/or southern bentonite, preferably is sodium bentonite.

The pH regulator can be any material that can regulate the pH of the bionic drilling fluid in the art. For example, the pH regulator can be selected from at least one of sodium hydroxide, potassium hydroxide, sodium carbonate, potassium carbonate, sodium bicarbonate, and potassium bicarbonate. The pH regulator can be used in the form of solid or solution; in the case that the pH regulator is used in the form of solution, its concentration can be 10 wt % to saturated concentration.

The flow pattern regulator usually is a low-viscosity polymer obtained through modifying the chemical structure of a natural polymer. For example, it can be a modified natural polymer that contains at least one of sulfonic groups, phenolic hydroxyl groups, and hydroxyl groups. Such a flow pattern regulator can be absorbed to the surface of solid particles and break or impair the intergranular spatial grid structure. Examples of the modified natural polymer include but are not limited to: at least one of low-viscosity polyanionic cellulose, xanthan gum, sulfonated sodium tannin, and sulfonated tannin extract, all of which are commercially available. For example, the low-viscosity polyanionic cellulose can be purchased from Puyang Pearl Chemical Co., Ltd., and the xanthan gum, sulfonated sodium tannin, and sulfonated tannin extract can be purchased from Henan Mingtai Chemical Co., Ltd.

The lubricant has a function of improving surface smoothness of mud cakes, as well as functions of inhibiting the frictional effect in the drilling fluid system, preventing increase of viscous shearing force in the system, and reducing or eliminating wedging of drilling tools. In the bionic drilling fluid, the lubricant should have a favorable lubrication effect, and should not cause compromised overall performance of the system. For example, it should not have any adverse effect on the viscosity. The lubricant can be of a type well known to those skilled in the art, and can be any lubricant that can be used for drilling fluids in the art. For example, it can be a solid lubricant or a liquid lubricant. Examples of the solid lubricant may include but are not limited to graphite, carbon black, and micro glass beads. Examples of the liquid lubricant may include but are not limited to: mineral oils, hydrocarbon lubricants, and esters lubricants, wherein, the hydrocarbon lubricants can be white oil or poly-a-olefins, for example; the ester lubricants can be butyl stearate or polyglycol ester, etc. All of the lubricants described above are commercially available.

According to the present subject matter, the weighting agent usually is barite. In addition, in comprehensive consideration of the density and rheological property of the drilling fluid, the density of the barite preferably is 4.2-4.3 g/cm$^3$.

In addition, besides the nanocrystalline cellulose filtrate reducer, the bionic drilling fluid provided in the present subject matter may contain 3-6 wt % other filtrate reducers. Wherein, these filtrate reducers can be any materials that can reduce the filter loss in bionic drilling fluids in the art. For example, they can be modified natural polymers such as carboxymethyl cellulose and carboxymethyl starch, etc., or synthetic polymers such as sulfomethylated phenolic resins, sulfonated lignite resins, or acrylamide/acrylic acid copolymers.

The method for preparation of the bionic drilling fluid provided in the present subject matter comprises: mixing the bionic wall bracing agent, bionic shale inhibitor, filtrate reducer, amphiphilic reservoir protectant, and optional bentonite, pH regulator, flow pattern regulator, lubricant, weighting agent, and water to a homogeneous state. Wherein, the types and concentrations of the bionic wall bracing agent, bionic shale inhibitor, filtrate reducer, amphiphilic reservoir protectant, bentonite, pH regulator, flow pattern regulator, lubricant, and weighting agent have been described above, and will not be detailed further here.

There is no particular restriction on the mixing method in the present subject matter, as long as the components in the bionic drilling fluid can be mixed homogeneously. According to an embodiment of the present subject matter, the mixing is carried out with the following method:

(1) preparing raw mud: adding bentonite that accounts for 2-5 wt % of the total weight of the drilling fluid and a pH regulator that accounts for 0.06-0.3 wt % of the total weight of the drilling fluid, stirring for 20-40 min., and holding for 12-24 h;

(2) adding a flow pattern regulator that accounts for 0.3-1 wt % of the total weight of the drilling fluid, continuing to stir for 10-30 min., till the flow pattern regulator is dissolved fully;

(3) adding a bionic wall bracing agent that accounts for 3-7 wt % of the total weight of the drilling fluid, continuing to stir for 20-40 min., till the bionic wall bracing agent is dissolved fully;

(4) adding an amphiphilic reservoir protectant that accounts for 2-3 wt % of the total weight of the drilling fluid, continuing to stir for 10-30 min., till the amphiphilic reservoir protectant is dissolved fully;

(5) adding other filtrate reducers that account for 3-6 wt % of the total weight of the drilling fluid, continuing to stir for 10-30 min., so that the filtrate reducers are dissolved fully;

(6) adding a bionic shale inhibitor that accounts for 1-2 wt % of the total weight of the drilling fluid, continuing to stir for 10-30 min., till the bionic shale inhibitor is dissolved fully;

(7) adding a lubricant that accounts for 2-4 wt % of the total weight of the drilling fluid, continuing to stir for 10-30 min., till the lubricant is dissolved fully;

(8) adding a nanocrystalline cellulose filtrate reducer that accounts for 0.5-1 wt % of the total weight of the drilling fluid, continuing to stir for 10-30 min., till the nanocrystalline cellulose filtrate reducer is dissolved fully;

(9) adding a barite weighting agent that accounts for 10-20 wt % of the total weight of the drilling fluid, continuing to stir for 20-40 min., till the barite is dispersed fully;

(10) waiting till the components of the drilling fluid are dissolved or dispersed homogeneously. Thus, the bionic drilling fluid is obtained.

Hereunder the present subject matter will be further detailed in some embodiments.

In the following examples, the molecular weight of the polymer is measured with a Gel Permeation Chromatograph (GPC) Model PL-GPC220 from Polymer Laboratories Co., Ltd. (abbreviated as PL Company).

The weight percentages of the components in the following examples are based on the total weight of the bionic drilling fluid.

The raw materials used in the following examples are as follows:

(1) Bionic wall bracing agent GBFS-1, which is a straw yellow liquid, and is prepared as follows:
  1) Load 1,000 kg deionized water into a flask, add 50 kg carboxymethyl chitosan (from Beijing DaTianFengTuo Chemical Technology Co., Ltd., with a structure represented by formula (III), weight-average molecular weight=52,000 g/mol, carboxymethyl substitution value=1.4) while stirring (at 200 rmp stirring rate); continue to stir after the materials are added, till the carboxymethyl chitosan is dissolved completely and there is no flocculent solid suspension in the solution essentially.
  2) Add 50 kg acrylic acid into the carboxymethyl chitosan solution, and stir for 5 min.; then, add 2 kg nitric acid, and continue to stir for 5 min., till the carboxymethyl chitosan, acrylic acid, and nitric acid solution are mixed homogeneously. Next, add 4 kg ammonium ceric nitrate, and stir till the ammonium ceric nitrate is dissolved fully. Then, heat up the reaction system to 70° C., carry out timing for 4 h after the temperature in the reactor reaches 70° C., and cool down the reactor to 25° C. after the reaction. The product in the first stage should be a straw yellow clear liquid.
  3) Add 5 kg 1-ethyl-3-(3-dimethyllaminopropyl) carbodiie hydrochlide into the reaction system after cooling (divide the 5 kg 1-ethyl-3-(3-dimethyllaminopropyl) carbonyl diimine hydrochloride into 5 parts, stir for 15 min. after each part is added, and then add the next part, and so on, till all parts are added). Next, stir for 12 h at room temperature, till the 1-ethyl-3-(3-dimethyllaminopropyl) carbonyl diimine hydrochloride is dissolved fully. The product is still a straw yellow clear solution.
  4) Add 5 kg dopamine hydrochloride into the system with 1-ethyl-3-(3-dimethyllaminopropyl) carbodiie hydrochlide dissolved in it, and stir for 24 h at room temperature, till the final product bionic wall bracing agent GBFS-1 is produced. The final product is a straw yellow liquid with certain viscosity. The measured weight-average molecular weight of the reaction product bionic wall bracing agent GBFS-1 is 84,320 g/mol.

(2) Bionic shale inhibitor YZFS-1, which is dark brown solid powder, and is prepared as follows:
  1) Mix 0.5 mol (87.1 g) L-arginine with 0.2 mol (29.2 g) L-lysine at 195° C. while stirring, add 1.75 mol (171.5 g) phosphoric acid (85 wt % phosphoric acid solution), and hold for 16 h at 195° C. for reaction. Add 200 g water when the temperature drops to about 120° C. after the reaction is completed, and continue to stir for 20 min., till the product is completely dissolved in water.
  2) Take out the reaction product (water solution) and dry it at about 120° C. to obtain a solid product, dissolve the solid product in dimethyl sulfoxide, and separate the insoluble substances from the solution by suction filtration. Next, evaporate the solution by rotary evaporation. Thus, the bionic shale inhibitor YZFS-1 disclosed in the present subject matter is obtained. The bionic shale inhibitor YZFS-1 is dark brown solid powder, with 1,551 g/mol weight-average molecular weight.

(3) Nanocrystalline cellulose filtrate reducer NCR-1, which is yellowish brown solid powder, and is prepared as follows:
  1) Add 40 g microcrystalline cellulose (in 50 μm average grain diameter) into 700 mL 64 wt % sulfuric acid solution, and stir for 7 h at 150 rpm stirring rate at 55° C.
  2) Add 3 L deionized water into the mixture obtained in step (1) to terminate the hydrolytic reaction of the microcrystalline cellulose, carry out centrifugal separation of the resultant suspension for 15 min. at 11,000 rpm, and wash the solid obtained through centrifugal separation with deionized water for three times, till the pH of the clear solution obtained through centrifugal separation is 7; finally, dry the clean solid at 105° C. for 12 h. Thus, 36.6 g nanocrystalline cellulose NCR-1 is obtained, and it is yellowish brown solid powder.

(4) Amphiphilic reservoir protectant LCB-1, which is yellowish solid powder, and is prepared as follows:
  1) Add styrene (15 g, 0.14 mol), N,N-dimethylamino ethyl methacrylate (11.3 g, 0.072 mol), 2-acrylamide-2-methylpropanesulfonic acid (14.9 g, 0.072 mol), and N,N'-diethylacrylamide (3.66 g, 0.029 mol) into 100 mL water and stir to form an emulsion, feed nitrogen into the emulsion for 30 min. and then heat up the emulsion to 70° C., add 0.5 g 4,4'-azobis(4-cyanovaleric acid) at that temperature, and then further heat up to 75° C. and hold at the temperature for 6 h for reaction.
  2) Cool down the solution to room temperature (20° C.) after the reaction is completed, evaporate off the aqueous dispersion of the product with a rotary evaporator, and grind the solid into powder state; thus, amphiphilic reservoir protectant LCB-1 is obtained, which is yellowish solid powder, with 213,200 g/mol weight-average molecular weight.

(5) Flow pattern regulator XC-1, which is straw yellow solid powder, with xanthan gum as the main ingredient, purchased from Beijing Ranbo Chemical Technology Development Co., Ltd., trademarked as XC-1.

(6) Temperature-tolerant filtrate reducer SPM-2, which is dark brown solid powder, a mixture of sulfomethylated phenolic resin (SMP-II, from Jiangxi Pingxiang Hengchang New Chemical Materials Co., Ltd.) and sulfomethylated lignite resin (SPNH, from Renqiu Gaoke Chemical Materials Co., Ltd.), at 2:1 weight ratio of SMP-II to SPNH.

(7) Kubricant FK-10, which is pale straw yellow oily liquid, with sulfonated oil sediment as the main ingredient (prepared from mineral oil and surfactants through emulsion reaction), purchased from Hunan Zhongcheng Technology Development Co., Ltd., trademarked as FK-10.

(8) Barite weighting agent, with barium sulfate as the main ingredient, purchased from Guizhou Kaili Longteng Minerals Co., Ltd., at 4.32 g/cm$^3$ density.

(9) Sodium bentonite: sodium bentonite for drilling fluid test, produced by Boyou Mud Technology Co., Ltd. under Shengli Oilfield Group.

Example 1

This example is provided to describe the method for preparing the bionic drilling fluid provided in the present subject matter.

(1) Load 400 mL tap water into a stirring cup, and start the stirrer to stir;

(2) Add 4 wt % sodium bentonite and 0.3 wt % sodium carbonate, stir for 40 min., and hold for 24 h;

(3) Add 0.7 wt % flow pattern regulator XC-1, and continue to stir for 30 min., so that the flow pattern regulator is dissolved fully;

(4) Add 3 wt % bionic wall bracing agent GBFS-1, and continue to stir for 40 min., so that the bionic wall bracing agent is dissolved fully;

(5) Add 2 wt % amphipathic reservoir protectant LCB-1, and continue to stir for 30 min., so that the amphipathic reservoir protectant is dissolved fully;

(6) Add 6 wt % temperature-tolerant filtrate reducer SPM-2, and continue to stir for 20 min., so that the filtrate reducer is dissolved fully;

(7) Add 1 wt % bionic shale inhibitor YZFS-1, and continue to stir for 20 min., so that the bionic shale inhibitor is dissolved fully;

(8) Add 2 wt % lubricant FK-10, and continue to stir for 20 min., so that the lubricant is dissolved fully;

(9) Add 0.5 wt % nanocrystalline cellulose filtrate reducer NCR-1, and continue to stir for 30 min., so that the filtrate reducer is dissolved fully;

(10) Add 10 wt % barite weighting agent, and continue to stir for 40 min., so that the barite is dissolved fully;

(11) A final product bionic drilling fluid A1 is obtained after all the components are dissolved to a homogeneous state.

Example 2

This example is provided to describe the method for preparing the bionic drilling fluid provided in the present subject matter.

(1) Load 400 mL tap water into a stirring cup, and start the stirrer to stir;

(2) Add 4 wt % sodium bentonite and 0.3 wt % sodium carbonate, stir for 40 min., and hold for 24 h;

(3) Add 0.5 wt % flow pattern regulator XC-1, and continue to stir for 30 min., so that the flow pattern regulator is dissolved fully;

(4) Add 5 wt % bionic wall bracing agent GBFS-1, and continue to stir for 40 min., so that the bionic wall bracing agent is dissolved fully;

(5) Add 2.5 wt % amphipathic reservoir protectant LCB-1, and continue to stir for 30 min., so that the amphipathic reservoir protectant is dissolved fully;

(6) Add 5 wt % temperature-tolerant filtrate reducer SPM-2, and continue to stir for 20 min., so that the filtrate reducer is dissolved fully;

(7) Add 1.5 wt % bionic shale inhibitor YZFS-1, and continue to stir for 20 min., so that the bionic shale inhibitor is dissolved fully;

(8) Add 2 wt % lubricant FK-10, and continue to stir for 20 min., so that the lubricant is dissolved fully;

(9) Add 0.7 wt % nanocrystalline cellulose filtrate reducer NCR-1, and continue to stir for 30 min., so that the filtrate reducer is dissolved fully;

(10) Add 10 wt % barite weighting agent, and continue to stir for 40 min., so that the barite is dissolved fully;

(11) A final product bionic drilling fluid A2 is obtained after all the components are dissolved to a homogeneous state.

Example 3

This example is provided to describe the method for preparing the bionic drilling fluid provided in the present subject matter.

(1) Load 400 mL tap water into a stirring cup, and start the stirrer to stir;

(2) Add 4 wt % sodium bentonite and 0.3 wt % sodium carbonate, stir for 40 min., and hold for 24 h;

(3) Add 0.3 wt % flow pattern regulator XC-1, and continue to stir for 30 min., so that the flow pattern regulator is dissolved fully;

(4) Add 7 wt % bionic wall bracing agent GBFS-1, and continue to stir for 40 min., so that the bionic wall bracing agent is dissolved fully;

(5) Add 3 wt % amphipathic reservoir protectant LCB-1, and continue to stir for 30 min., so that the amphipathic reservoir protectant is dissolved fully;

(6) Add 4 wt % temperature-tolerant filtrate reducer SPM-2, and continue to stir for 20 min., so that the filtrate reducer is dissolved fully;

(7) Add 2 wt % bionic shale inhibitor YZFS-1, and continue to stir for 20 min., so that the bionic shale inhibitor is dissolved fully;

(8) Add 3 wt % lubricant FK-10, and continue to stir for 20 min., so that the lubricant is dissolved fully;

(9) Add 1 wt % nanocrystalline cellulose filtrate reducer NCR-1, and continue to stir for 30 min., so that the filtrate reducer is dissolved fully;

(10) Add 10 wt % barite weighting agent, and continue to stir for 40 min., so that the barite is dissolved fully;

(11) A final product bionic drilling fluid A3 is obtained after all the components are dissolved to a homogeneous state.

Comparative Example 1

This comparative example is provided to describe a comparative bionic drilling fluid and the method for preparing it.

Prepare the bionic drilling fluid with the method described in the example 1, but replace the bionic wall bracing agent GBFS-1 with a potassium polyacrylamide collapse inhibitor (KPAM, from Shangdong Yanggu Jiangbei Chemical Co., Ltd.) in the same pbw. Thus, a comparative bionic drilling fluid DA1 is obtained.

Comparative Example 2

This comparative example is provided to describe a comparative bionic drilling fluid and the method for preparing it.

Prepare the bionic drilling fluid with the method described in the example 1, but replace the amphiphilic reservoir protectant LCB-1 with water in the same pbw; thus, a comparative bionic drilling fluid DA2 is obtained.

Comparative Example 3

This comparative example is provided to describe a comparative bionic drilling fluid and the method for preparing it.

Prepare the bionic drilling fluid with the method described in the example 1, but replace the bionic shale inhibitor YZFS-1 with a small cationic shale inhibitor (CSM-1, from Tianjian Petroleum Technology Co., Ltd.) in the same pbw. Thus, a comparative bionic drilling fluid DA3 is obtained.

Comparative Example 4

This comparative example is provided to describe a comparative bionic drilling fluid and the method for preparing it.

Prepare the bionic drilling fluid with the method described in the example 1, but replace the nanocrystalline cellulose filtrate reducer NCR-1 with a temperature-tolerant filtrate reducer SPM-2 in the same pbw; thus, a comparative bionic drilling fluid DA4 is obtained.

Test Case 1

Measure the plastic viscosity, yield point, API filter loss, and HTHP filter loss of the bionic drilling fluids A1-A3 and comparative bionic drilling fluids DA1-DA4 respectively with the method recorded in GB/T 16783.1-2006 Petroleum and Natural Gas Industries—Field Testing of Drilling Fluids—Part 1: Water-Based Fluids. The results are shown in Table 1.

TABLE 1

| No. | Plastic Viscosity/ mPa·s | Yield point/ Pa | API Filter Loss/mL | HTHP Filter loss/mL |
|---|---|---|---|---|
| A1 | 35 | 14.5 | 5.2 | 12.8 |
| A2 | 32 | 13.5 | 5.8 | 14.6 |
| A3 | 29 | 12.0 | 5.8 | 15.2 |
| DA1 | 41 | 19.5 | 7.8 | 17.0 |
| DA2 | 29 | 11.5 | 9.4 | 21.5 |
| DA3 | 31 | 9.5 | 4.8 | 11.5 |
| DA4 | 25 | 14.0 | 8.0 | 18.2 |

Test Case 2

Measure the hot rolling recovery rate of mud shale cuttings in the bionic drilling fluid A1-A3 and comparative bionic drilling fluids DA3 respectively. The test procedures are as follows: take 300 mL drilling fluids described above and load them into hot cans respectively, add 50 g 6-10 mesh clay shale cuttings into them, and carry out hot rolling for 16 h at 130° C., respectively; then, sieve them through a 40 mesh sieve, wash with tap water for about 2 min., and dry the screen tailings at 105±3° C. to constant weight respectively; next, weigh the obtained products, and calculate the hot rolling recovery rate R=weight after drying/dry weight before test. The results are shown in Table 2. Wherein, the higher the recovery rate is, the higher the inhibition capability of the drilling fluid is; in contrast, the lower the recovery rate is, the lower the inhibition capability of the drilling fluid is. It can be seen from Table 2: the hot rolling recovery rates of drilling fluids without the bionic inhibitor disclosed in the present subject matter are severely lower, which indicates that the bionic shale inhibitor disclosed in the present subject matter takes a crucial role in improvement of the mud shale inhibition capability of bionic drilling fluids.

TABLE 2

| No. | Hot Rolling Recovery Rate/% |
|---|---|
| A1 | 95.2 |
| A2 | 97.6 |
| A3 | 98.8 |
| DA3 | 71.5 |

Test Case 3

Measure the compression strength of rock core after hot rolling in the bionic drilling fluid A1-A3 and comparative bionic drilling fluids DA1 respectively. The test procedures are as follows: a. prepare three blocks of synthetic cores composed of 80 wt % quartz sand and 20 wt % bentonite with essentially the same basic indexes; b. roll the three blocks of rock cores in the bionic drilling fluids A1-A3 and comparative bionic drilling fluid DA1 at 120° C. for 16 h respectively; c. take out the rock cores and test their uniaxial compressive strength with a TAW-1000 pore pressure servo tester directly without drying them. The results are shown in Table 3. It can be seen from Table 3: the compression strength values of the rock cores after hot rolling in drilling fluids without the bionic wall bracing agent disclosed in the present subject matter are severely lowered, which indicates that the bionic wall bracing agent disclosed in the present subject matter takes a crucial role in improvement of the mud shale strengthening capability of bionic drilling fluids.

TABLE 3

| Shale Sample | Length/ mm | Diameter/ mm | Weight/ g | Density/ g/cm$^3$ | Compression Strength/MPa |
|---|---|---|---|---|---|
| Original rock core | 79.50 | 25.00 | 70.14 | 1.76 | 6.906 |
| After hot rolling in A1 | 77.30 | 25.00 | 66.84 | 1.76 | 8.562 |
| After hot rolling in A2 | 78.30 | 25.00 | 68.84 | 1.76 | 9.931 |
| After hot rolling in A3 | 77.80 | 25.00 | 67.53 | 1.76 | 10.06 |
| After hot rolling in DA1 | 78.10 | 25.00 | 67.95 | 1.76 | 7.150 |

Test Case 4

Carry out a rock core damage test for the bionic drilling fluid A1-A3 and comparative bionic drilling fluid DA2 respectively, to assess the reservoir protection capability of the bionic drilling fluids. The test procedures are as follows: a. carry out vacuum pumping for the rock cores (the same as those in the test case 3, see Table 3 for their properties), and saturate them for 24 h or longer time in 6 wt % standard brine; b. measure the permeability to oil K1 of the rock cores in normal direction with decolorized kerosene in a JHMD-1 HTHP dynamic filter tester; c. carry out reverse displacement for the drilling fluids at 2-3PV at 0.1 ml/min. flow rate and hold for 12 h; d. measure the permeability to oil K2 after contamination in normal direction with decolored kerosene, and calculate the core permeability recovery rate S with expression S=K2/K1×100%. The test results are shown in Table 4.

TABLE 4

| | Rock Core No. | Permeability to Oil/10$^{-3}$ μm$^2$ | | | Recovery Rate of Permeability/% | |
|---|---|---|---|---|---|---|
| No. | | Initial Value | After Damage | After End Face Cutting* | After Damage | After End Face Cutting* |
| A1 | 1 | 191.62 | 170.94 | 175.89 | 89.2 | 91.8 |
| A2 | 2 | 129.46 | 117.89 | 118.98 | 91.1 | 91.9 |
| A3 | 3 | 135.79 | 127.4 | 130.3 | 93.8 | 96.0 |
| DA2 | 5 | 145.31 | 119.5 | 123.8 | 82.2 | 85.2 |

In Table 4, the Permeability to Oil (Initial Value) refers to the permeability to oil of rock core before the rock core is saturated in standard brine; the Permeability to Oil (After Damage) refers to the permeability to oil of rock core after the rock core is saturated in standard brine; the Permeability to Oil (After End Face Cutting) refers to the permeability to oil of the rock core after the rock core is saturated in standard brine and the two ends are cut off by 2 cm respectively.

It can be seen from the above results: the bionic drilling fluid provided in the present subject matter has outstanding rheological property, filtrate wall building property, shale inhibition property, and nanometer-level and micrometer-level pore plugging property. Thus it can be seen: the bionic drilling fluid provided in the present subject matter can effectively solve the problem of well wall instability, and has great industrial application prospects.

While some preferred embodiments of the present invention are described above, the present invention is not limited to the details in those embodiments. Those skilled in the art can make modifications and variations to the technical scheme of the present invention, without departing from the spirit of the present invention. However, all these modifications and variations shall be deemed as falling into the protected scope of the present invention.

In addition, it should be appreciated that the technical features described in the above embodiments can be combined in any appropriate manner, provided that there is no conflict among the technical features in the combination. To avoid unnecessary iteration, such possible combinations are not described here in the present invention.

Moreover, different embodiments of the present invention can be combined freely as required, as long as the combinations don't deviate from the ideal and spirit of the present invention. However, such combinations shall also be deemed as falling into the scope disclosed in the present invention.

What is claimed is:

1. A bionic drilling fluid, comprising a bionic wall bracing agent, a bionic shale inhibitor, a filtrate reducer, and an amphiphilic reservoir protectant, wherein the filtrate reducer comprises nanocrystalline cellulose;

wherein the bionic wall bracing agent comprises a backbone moiety of carboxymethyl chitosan with dopamine-derived base groups grafted on the backbone, wherein, the dopamine-derived base groups are represented by formula (1):

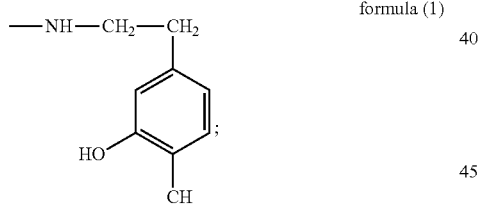

formula (1)

wherein the bionic shale inhibitor is composed of structural units represented by formula (2) and structural units represented by formula (3):

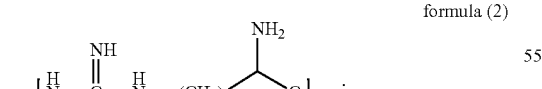

formula (2)

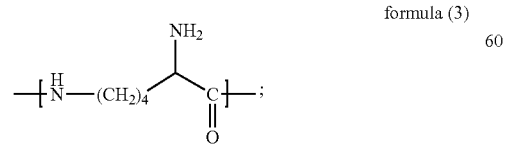

formula (3)

wherein the molar ratio of the structural units represented by formula (2) to the structural units represented by formula (3) is 0.2-6:1, and the weight-average molecular weight of the bionic shale inhibitor is 800-4,000 g/mol;

wherein the amphiphilic reservoir protectant is composed of structural units represented by formula (4), formula (5), formula (6), and formula (7):

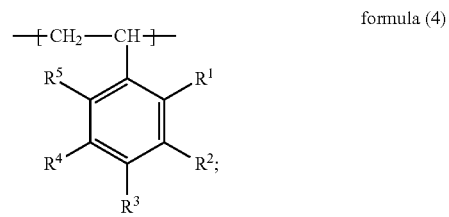

formula (4)

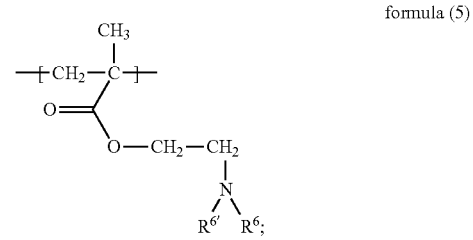

formula (5)

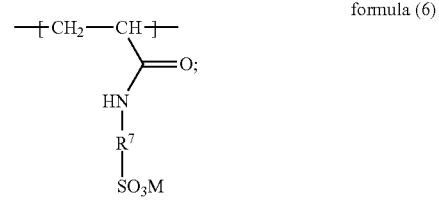

formula (6)

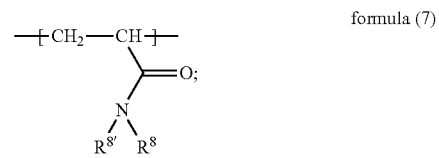

formula (7)

where, $R^1$, $R^2$, $R^3$, $R^4$, and $R^5$ are H, $C_1$-$C_4$ alkyl or $C_1$-$C_4$ alkoxyl respectively and independently; $R^6$ and $R^{6'}$ are $C_1$-$C_3$ alkyl respectively and independently;

$R^7$ is substituted or unsubstituted $C_1$-$C_6$ alkyl; M is H or an alkali metal; $R^8$ and $R^{8'}$ are $C_1$-$C_6$ alkyl, hydroxyl-substituted $C_1$-$C_6$ alkyl, phenyl or $C_1$-$C_6$ alkyl-substituted phenyl respectively and independently;

the molar ratio of the structural units represented by formula (4), the structural units represented by formula (5), the structural units represented by formula (6) and the structural units represented by formula (7) is 1:0.4-2:0.5-1:0.1-0.5;

the weight-average molecular weight of the amphiphilic reservoir protectant is 150,000-350,000 g/mol; and wherein based on the total weight of the bionic drilling fluid, the content of the bionic wall bracing agent is 3-7 wt %, the content of the bionic shale inhibitor is 1-2 wt %, the content of the nanocrystalline cellulose is 0.5-1 wt %, and the content of the amphiphilic reservoir protectant is 2-3 wt %.

2. The bionic drilling fluid according to claim 1 wherein the bionic wall bracing agent contains structural units represented by formula (I):

formula (I)

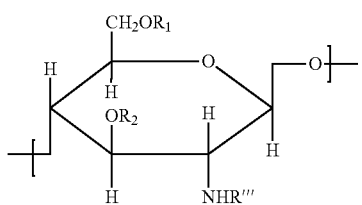

in formula (I), $R_1$ is H,

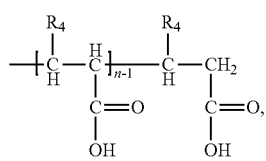

—$CH_2COOR_3'$,

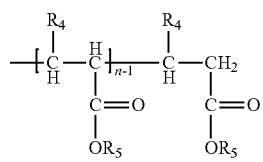

or —$CH_2COOR_3$, $R_2$ is H,

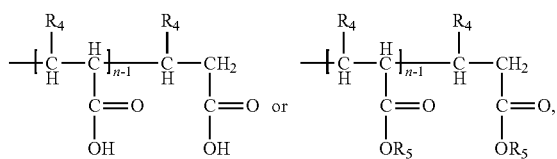

and at least one of $R_1$ and $R_2$ is

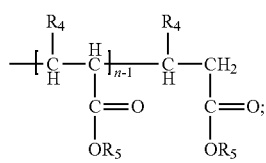

n is an integer equal to or greater than 1; wherein each $R_5$ is H or the dopamine-derived base groups respectively and independently, and at least one $R_5$ is the dopamine-derived base group; $R_4$ is H or $C_1$-$C_{10}$ alkyl; R''' is H, —$CH_2COOR_3'$ or —$CH_2COOR_3$, and R1 and R''' are not H at the same time; $R_3'$ is H or an alkali metal; $R_3$ is the dopamine-derived base group.

3. The bionic drilling fluid according to claim 1 wherein in the amphiphilic reservoir protectant, $R^1$, $R^2$, $R^3$, $R^4$ and $R^5$ are H, methyl, ethyl, methoxyl, or ethyoxyl respectively and independently.

4. The bionic drilling fluid according to claim 1 wherein $R^6$ and $R^{6'}$ are methyl or ethyl respectively and independently.

5. The bionic drilling fluid according to claim 1 wherein $R^7$ is —$CH_2$—$C(CH_3)_2$, —$CH_2$—, —$C(CH_3)_2$—$CH_2$—, —$CH_2$—$C(CH_3)_2$—, —$CH_2$—$C(CH_3)_2$—$CH_2$—$CH_2$—, —$CH_2$—$CH_2$—, —$CHCH_3$—$CH_2$—, or —$CH_2$—$CHCH_3$—$CH_2$—; M is H, Na, K, or Li.

6. The bionic drilling fluid according to claim 1 wherein $R^8$ and $R^{8'}$ are methyl, ethyl, n-propyl, n-butyl, iso-butyl, n-hexyl, phenyl, p-methylphenyl, p-ethylphenyl, methylol or ethoxyl respectively and independently.

7. The bionic drilling fluid according to claim 1 further comprising at least one of bentonite, pH regulator, flow pattern regulator, lubricant, weighting agent, and water.

8. The bionic drilling fluid according to claim 7 wherein based on the total weight of the bionic drilling fluid, the content of the bentonite is 2-5 wt %, the content of the pH regulator is 0.06-0.3 wt %, the content of the flow pattern regulator is 0.3-1 wt %, the content of the lubricant is 2-4 wt %, the content of the weighting agent is 10-20 wt %, and water accounts for the remaining content.

9. The bionic drilling fluid according to claim 7 wherein the bentonite is sodium bentonite;
the pH regulator is selected from at least one of sodium hydroxide, potassium hydroxide, sodium carbonate, potassium carbonate, sodium bicarbonate, and potassium bicarbonate;
the flow pattern regulator is a modified natural polymer that contains at least one of sulfonic groups, phenolic hydroxyl groups, and hydroxyl groups.

10. The bionic drilling fluid according to claim 9 wherein the flow pattern regulator is a modified natural polymer that contains at least one of low-viscosity poly-anionic cellulose, xanthan gum, sulfonated sodium tannin, and sulfonated tannin extract.

11. The bionic drilling fluid according to claim 7 wherein the lubricant is at least one of mineral oil, hydrocarbon lubricant, and ester lubricant.

12. The bionic drilling fluid according to claim 7 wherein the weighting agent is barite.

* * * * *